Figure 1:
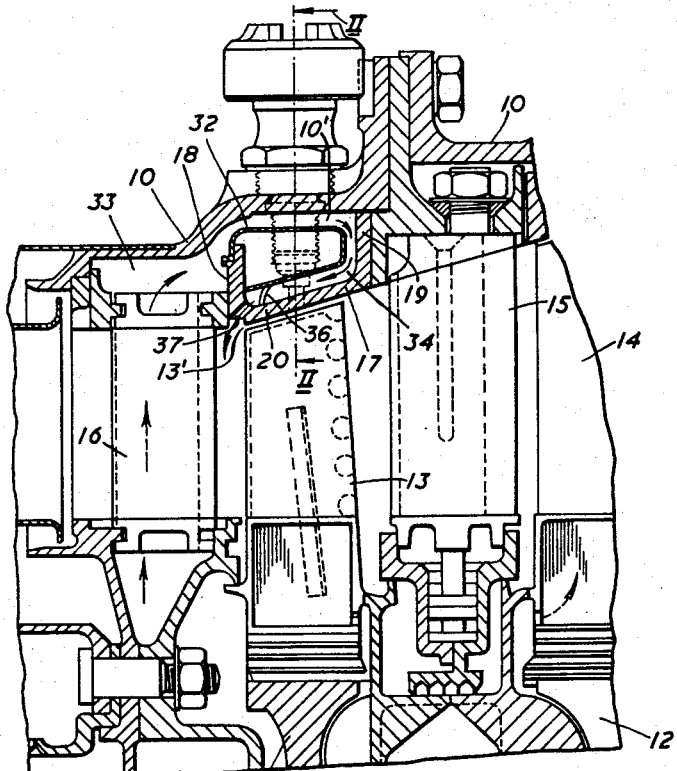

Nov. 29, 1960   B. T. G. BISHOP   2,962,256
TURBINE BLADE SHROUD RINGS
Filed March 21, 1957

INVENTOR
BASIL T. G. BISHOP
BY Watson, Cole, Grindle
& Watson,
ATTORNEYS.

United States Patent Office 2,962,256
Patented Nov. 29, 1960

2,962,256
TURBINE BLADE SHROUD RINGS

Basil Thomas George Bishop, London, England, assignor to D. Napier & Son Limited, London, England, a company of Great Britain Filed Mar. 21, 1957, Ser. No. 647,551

Claims priority, application Great Britain Mar. 28, 1956

5 Claims. (Cl. 253—39)

This invention relates to turbine shroud rings that is to say the shroud rings which closely surround rings of rotor blades in a turbine. It is desirable that the clearance between such a shroud ring and the tips of the rotor blades shall be maintained small and shall not vary to any large degree under different operating conditions, such as the wide temperature variations normally encountered in turbine operation, and it is an object of the present invention to provide a shroud ring construction which will enable the clearance between the shroud ring and the tips of the rotor blades to be maintained within small limits and to prevent or reduce any tendency for the shroud ring as a whole to be distorted under operating conditions.

A turbine according to the present invention comprises a casing and a shroud ring closely surrounding a ring of rotor blades, the shroud ring being in the form of a series of separate arcuate circumferentially extending sections each connected to the casing by means of a thermal adjusting device including a thermal expansion member so arranged that when the shroud ring and/or the casing or the rotor blades, expand or contact thermally, the radial clearance between the shroud ring and the rotor blades is maintained within small limits of its designed value.

Preferably each thermal adjusting device comprises a low expansion member (that is a member with a low coefficient of thermal expansion) connected to the casing and extending radially outwards, and a high expansion member connected to the outer end of the low expansion member and extending radially inwards, and connected at its inner end to a section of the shroud ring.

Thus in one preferred construction the low expansion member is in the form of a sleeve extending radially outwards from the casing while the high expansion member is in the form of a tube or rod lying partly within the sleeve and secured at its outer end to the outer end of the sleeve, and passing through an aperture in the wall of the casing, its inner end being secured to one of the sections of the shroud ring. In any case each of the shroud ring sections is preferably connected to the next adjacent segment in a manner permitting relative movement at the point of connection in a circumferential direction, to compensate for example for thermal expansion, while locating the two adjacent ends of the sections relative to one another in a radial direction.

The connection between adjacent ends of the sections is preferably constructed as described and claimed in co-pending United States application No. 551,583.

Figure 2:
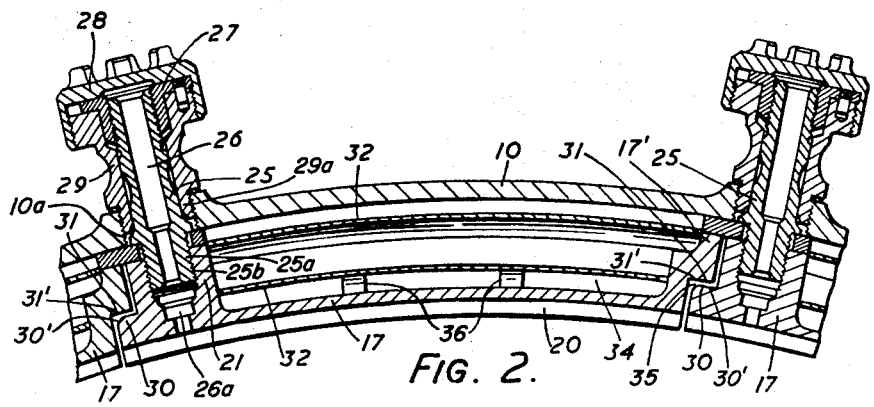

The invention may be performed in various different ways but one specific embodiment will now be described by way of example with reference to the accompanying drawings, in which Figure 1 is a fragmentary sectional view through part of the turbine showing the periphery of two turbine rotor discs, and the adjacent part of the turbine casing, and Figure 2 is a fragmentary cross sectional view through the turbine casing and shroud ring on the line II—II in Figure 1.

In this embodiment of the invention the turbine comprises an outer built-up casing 10 of generally cylindrical configuration, and two rotor discs 11, 12, each carrying a ring of rotor blades 13, 14 respectively. Each ring of rotor blades is surrounded by a shroud ring but only one such ring surrounding the rotor blade ring 13 will be described in detail. A ring of stator blades 15 is also supported from the casing 10 in a manner generally known per se so as to lie between the rotor blade rings and the casing also supports a ring of inlet guide vanes 16 upstream of the first rotor blade ring 13.

The shroud ring assembly surrounding the blade ring 13 comprises a supporting structure formed by the adjacent part of the outer tubular casing 10 and a shroud ring comprising a series of separate arcuate sections 17 each of channel shaped cross section in planes containing the axis of the turbine as shown in Figure 1, with the sides 18, 19 of the channel extending radially outwards from the base 20 of the channel. The base or inner circumferential wall 20 of each arcuate section, is in the form of a section of a frustum of a cone so that the inner circumferential surface of the shroud ring as a whole is of frusto-conical form to conform to the surface of revolution defined by the rotor blade ring 13, with due allowance for a small clearance 13' as shown in exaggerated proportions in Figure 1. The arcuate sections 17 constituting the shroud ring are arranged in a circumferential channel or recess 10' in the casing 10. Each arcuate section of the shroud ring is closed at its ends at 21 and 17' respectively as shown in Figure 2, the wall 21 closing one end being of substantial thickness and being provided with a screwthreaded bore the axis of which is radial with respect to the tubular outer casing Each arcuate section 17 is secured to the tubular outer casing 10 by thermal expansion devices comprising a bolt 25 of high expansion steel (that is to say a material with a high coefficient of thermal expansion) passing through a preferably internally threaded radially bore 10a in this casing, and with its inner screwthreaded end 25a threaded into the screwthreaded bore 25b in the adjacent end wall 21 of the respective arcuate shroud section. The bolt may have a central drilling 26 extending longitudinally from its inner end, which may communicate through a radial bore or passage 26a in the shroud ring section, with the casing interior so that the whole hollow interior of the bolt is in direct contact with the hot gases passing through the turbine. The outer end of the high expansion bolt 25, which extends an appreciable distance outside the casing, is secured by means of a screwthreaded collar 27 and a cap 28 to a low expansion steel sleeve 29 surrounding the outer end of the bolt, the inner end of this sleeve 29 being rigidly secured to the casing 10, as by threading its inner end 29a into the threaded outer end of bore 10a. The bores 10a will be arranged in an annular series concentric to the annular shroud ring defined by section 17. The bolt 25 is freely radially slidable through the sleeve to permit free radial expansion and contraction of the bolt from its point of connection to the sleeve 29 inwardly and outwardly through the sleeve and the bore 10a through which its projects into the casing 10 for connection to its associated shroud section 17. It will be seen therefore that when the thermal adjusting device, in common with the other parts of the turbine, is subject to increased temperatures the high expansion bolts 25 will cause the adjacent end of the respective arcuate shroud sections to move radially inwards relative to the tubular turbine casing 10, so as to compensate for the expansion of the casing. In practice by appropriate design of the parts, and selection of appropriate materials and lengths for the high and low expansion members, the clearance between the shroud ring sections and the tips of the rotor blades may be maintained within very close limits over the whole operating range of temperatures. The coefficient of thermal expansion of the bolts 25 in one preferred example is approximately $22.7 \times 10^{-6}$ per ° C. while that of the sleeves 29 is approximately $4.8 \times 10^{-6}$ per ° C.

Each end of each arcuate section 17 is moreover provided with a step lying in a tangential plane, the face 30' of the step 30 on the supported end 21 of each arcuate section facing radially outwards while the face 31' of the step 31 on the opposite free end of each arcuate section faces radially inwards. The steps on the adjacent ends of adjoining arcuate sections slidably engage one another so that the free or unsupported ends of the arcuate sections can move circumferentially to a limited extent relatively to the supported ends 21 of the sections which they engage but are held from inward radial movement other than the bodily radial movement resulting from the expansion and contraction of the bolts 25 and sleeves 29. The clearance 35 between the faces 30'—31' of steps 30—31 is shown much exaggerated for clarity in Figure 2.

In any case it will be seen that this construction enables each arcuate shroud section to be adjusted radially within the tubular turbine casing, by means of the thermal adjusting devices 25, 29, and still permits adequate circumferential expansion in the individual sections.

Mounted within each arcuate section 17 is a sheet metal baffle 32 provided with local projections 36 to locate it within the arcuate section while providing between the baffle and the walls of the arcuate section a narrow passage 34 through which cooling air can be caused to flow. The arrangement is conveniently such that one side of the passage 34, for example that at the upstream side of the arcuate section is open to a cooling air inlet passage leading from a cooling air chamber 33 in the tubular outer casing so that cooling air is caused to flow through this narrow cooling air passage 34 before escaping, for example through an outlet opening 37 in the base of the arcuate section, into the main gas stream passing through the turbine.

What I claim as my invention and desire to secure by Letters Patent is:

1. A turbine comprising a generally cylindrical casing, a ring of rotor blades within said casing, a shroud ring closely surrounding said ring of rotor blades, said shroud ring being in the form of a series of separate arcuate circumferentially extending sections, said casing being formed with an annular series of radial bores concentric to said shroud ring, and a series of thermal adjusting devices, each of the said sections being connected to said casing by one of said devices, each of said devices comprising a radially disposed low expansion member having its radially inner end fixed to said casing at one of said bores and projecting radially outwardly from said casing, and a high expansion member extending radially to said shroud ring and having its radially outer end normally fixed to the radially outer end of said low expansion member, said high expansion member extending radially through said bore for radial movement therethrough incident to thermal expansion and contraction and having its radially inner end normally fixed to a section of said shroud ring, both of said expansion members being of metal, the metal of said high expansion member having a substantially higher coefficient of thermal expansion than that of the said low expansion member, whereby increasing temperatures acting on said casing and said thermal adjusting devices will result in radially inward adjustment of said shroud ring sections to compensate for the resulting radially outward expansion of said casing.

2. A turbine as claimed in claim 1 in which said high expansion member has a hollow interior open at its inner radial end and the said shroud ring is formed with a bore therethrough establishing communication between said hollow interior and the interior of said casing.

3. A turbine as claimed in claim 1 in which said low expansion member is in the form of a sleeve extending radially outwards from said casing while said high expansion member lies partly within said sleeve and is secured at its outer end to the outer end of said sleeve.

4. A turbine comprising a generally cylindrical casing formed with an annularly arranged series of bores opening therethrough into its interior, a cylindrical sleeve of low thermal expansion material threaded into each said bore at its inner end and having a free outer end projecting radially outwardly from said bore, a bolt of high thermal expansion material disposed concentrically within said sleeve, the radially outer end of said bolt being fixedly connected to the radially outer end of said sleeve, the remainder of said bolt being freely movable through said sleeve and said bore incident to thermal expansion and contraction, said high expansion material having a coefficient of thermal expansion which is substantially higher than that of said low expansion material, a shroud ring disposed within said casing, said ring being defined by a series of arcuate shroud sections fixedly carried at the inner ends of the respective bolts for radial inward movement relative to said casing incident to thermal expansion of said casing, sleeves and bolts resulting from their exposure to increased temperatures within the turbine casing.

5. A turbine as defined in claim 4, wherein each said bolt and its associated shroud ring section are formed with communicating radial bores opening into the interior of said casing for reception of hot gases from the casing.

References Cited in the file of this patent

UNITED STATES PATENTS

| | | |
|---|---|---|
| 2,622,790 | McLeod | Dec. 23, 1952 |

FOREIGN PATENTS

| | | |
|---|---|---|
| 200,230 | Australia | Nov. 23, 1953 |
| 282,188 | Switzerland | Aug. 1, 1952 |
| 600,057 | Great Britain | Mar. 30, 1948 |
| 679,916 | Great Britain | Sept. 24, 1952 |
| 689,270 | Great Britain | Mar. 23, 1953 |